April 12, 1949. H. L. DANIELS 2,466,691
ELECTROMAGNETIC OSCILLOGRAPH
Filed April 9, 1945 3 Sheets-Sheet 2
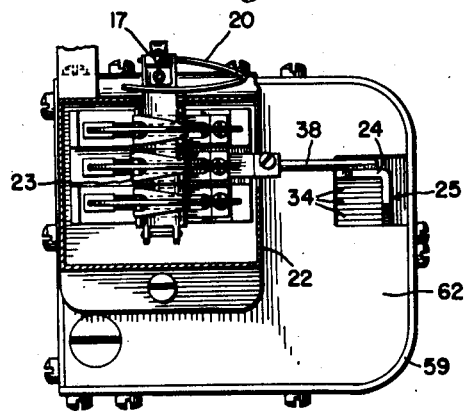
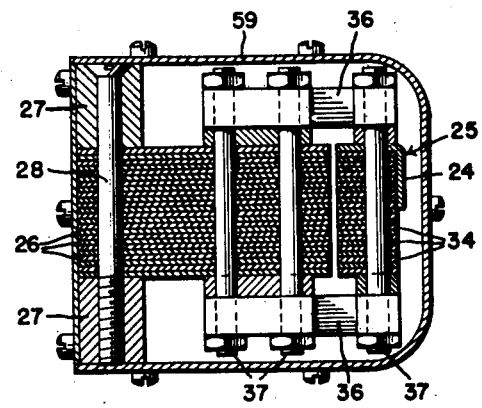
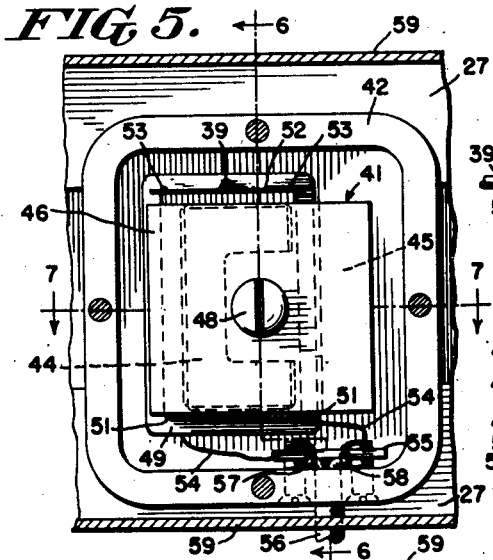
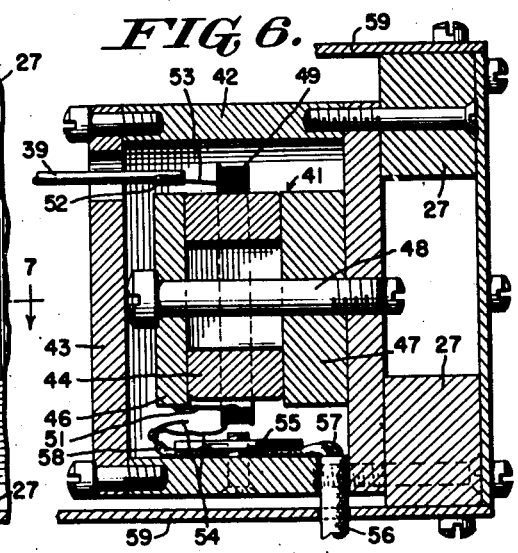
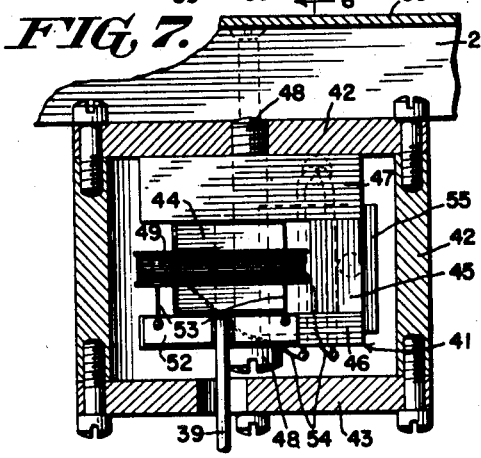
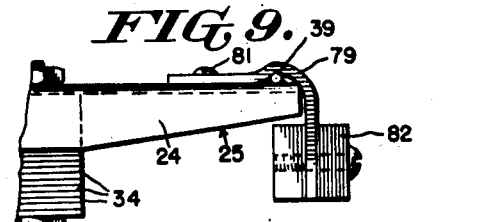
Inventor
H. L. Daniels
By Ralph L. Chappell
Attorney April 12, 1949.   H. L. DANIELS   2,466,691
ELECTROMAGNETIC OSCILLOGRAPH
Filed April 9, 1945   3 Sheets-Sheet 3

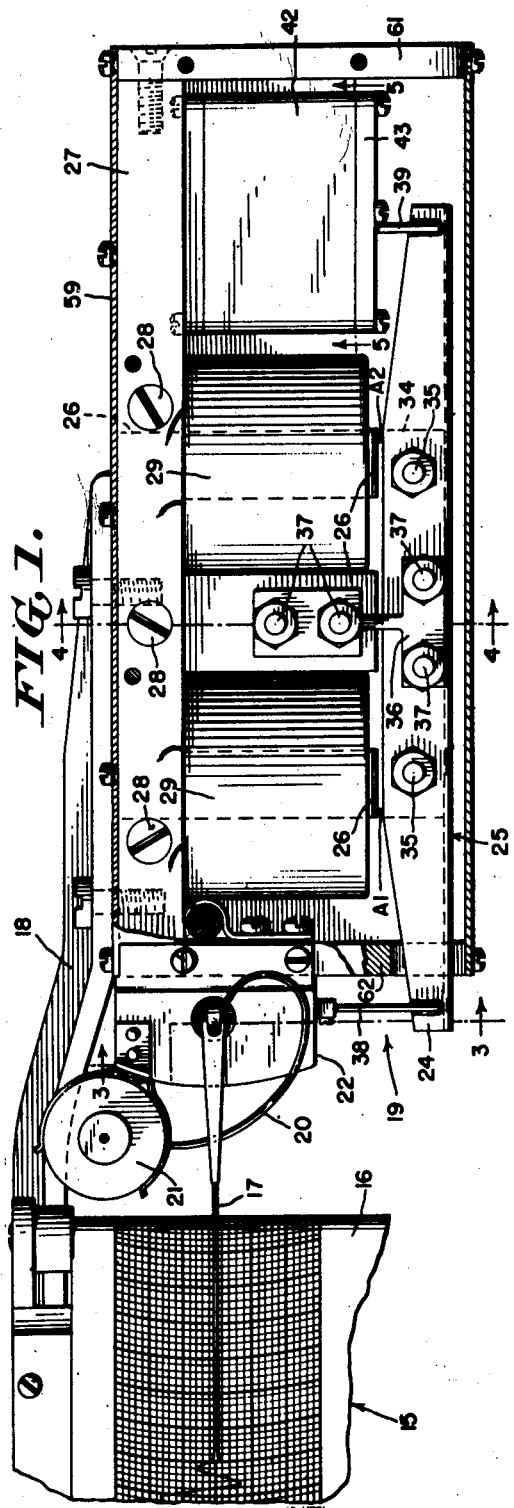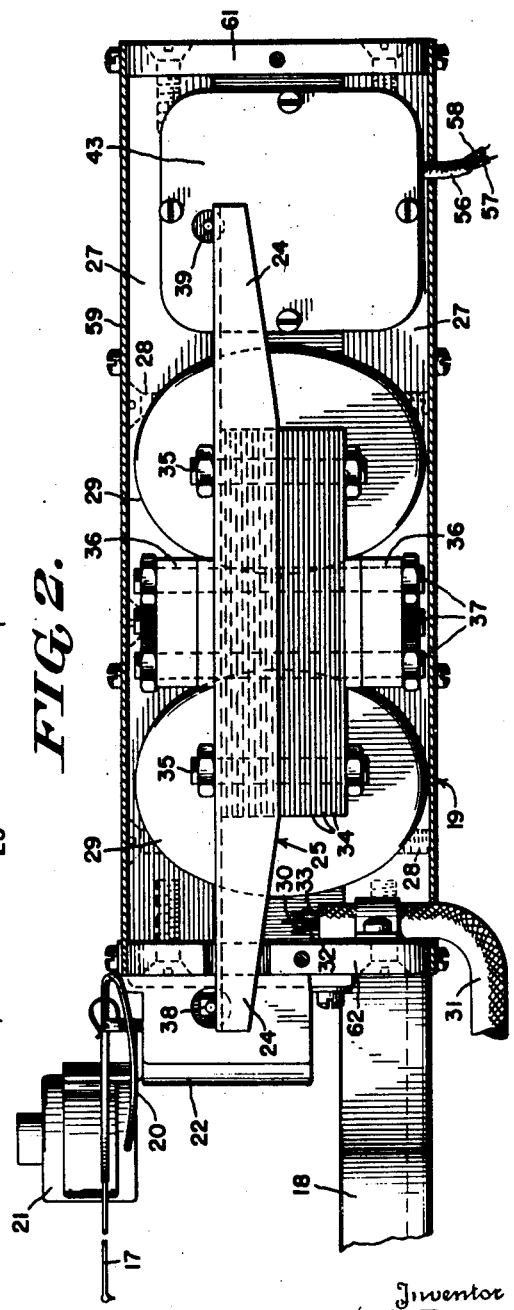

FIG. 8.

Inventor
H. L. Daniels
By Ralph L. Chappell
Attorney

Patented Apr. 12, 1949

2,466,691

UNITED STATES PATENT OFFICE 2,466,691

ELECTROMAGNETIC OSCILLOGRAPH

Howard L. Daniels, Mount Rainier, Md.

Application April 9, 1945, Serial No. 587,415

12 Claims. (Cl. 346—33)

(Granted under the act of March 3, 1883, as amended April 30, 1928; 370 O. G. 757)

This invention relates generally to oscillographs and more particularly to a high speed electromagnetic direct-recording pen or stylus type oscillograph adapted to record the instantaneous values of a voltage signal such, for example, as that produced by the heart or brain of the human body or a voltage signal which is caused to simulate, by the interposition of a suitable transducer, any one of a number of physical variables such, for example, as the envelopes of energy resident in the sound produced by ships or torpedoes.

The principal object of the present invention is to provide a direct-recording oscillograph in which the moving element or pen thereof is adapted to leave a record of sufficient amplitude, such that the record may be calibrated and interpreted readily without magnification, and at frequencies limited principally by the ability of the moving element to record with such amplitude.

Another object is to provide a direct-recording oscillograph which is adapted to record sinusoidal voltage signals having frequencies at least as high as fifty cycles per second with substantially flat response over a range of frequencies extending to this value.

Another object is the provision of a direct-recording oscillograph which provides a true reproduction of voltage signals applied thereto and, in addition, possesses all of the desired qualities of ruggedness and compactness of construction, durability and reliability in operation, and economy of manufacture.

A further object is to provide an electromechanical transducer for driving a recording element of an oscillograph in which the effective mass of the moving element of the transducer is suppressed relative to the effective mass of the recording element whereby extension of the upper limit of frequency response of the oscillograph may be facilitated.

A still further object of the invention is to provide a new and improved electromagnetic transducer adapted to cause a moving element thereof to be deflected linearly in response to electrical currents supplied thereto.

A still further object is to provide new and improved electrical means for damping an electromechanical transducer.

A still further object is the provision of an electromechanical transducer in which electrical means external thereto are provided for applying forces to the moving element of the transducer in a manner to simulate mechanical damping thereof.

An additional object of the invention resides in the provision of means providing damping voltages for an electromechanical transducer and an electronic amplifier adapted to supply currents for driving the transducer in accordance with the instantaneous values of damping and signal voltages received by the amplifier.

Still other objects, advantages and features of the invention not specifically set forth hereinbefore are those implied or inherent in the novel construction, combination and arrangement of parts as will become more clearly apparent as the description proceeds, reference being had to the accompanying drawings wherein:

Fig. 1 is a plan view of an electromagnetic transducer and associated recording and damping apparatus suitable for use with the direct-recording oscillograph of the present invention according to a preferred embodiment thereof;

Fig. 2 is a view in elevation of the parts shown in Fig. 2, except for the paper drive mechanism;

Fig. 3 is a sectional view of the transducer substantially as seen along the line 3—3 of Fig. 1, certain parts being shown in elevation;

Fig. 4 is a sectional view of the transducer substantially as seen along the line 4—4 of Fig. 1;

Fig. 5 is a somewhat enlarged view of the damping signal generator as seen within the shield thereof with the cover removed, substantially as seen along the line 5—5 of Fig. 1;

Fig. 6 is a sectional view of the damping signal generator taken along the line 6—6 of Fig. 5;

Fig. 7 is a sectional view of the damping signal generator as seen along the line 7—7 of Fig. 5, certain parts being shown in elevation;

Fig. 8 is a diagrammatic view of an electronic amplifier suitable for use with the electromagnetic transducer; and Fig. 9 is a fragmentary view of suitable mechanical means for suppressing high frequency coupling between the driving element of the transducer and the damping signal generator.

Referring now to the drawings for a detailed description of the invention and more particularly to Fig. 1 thereof, the numeral 15 generally designates a paper drive mechanism suitable for use with the oscillograph of the present invention, the drive mechanism including a moving chart 16 of sufficient width to accommodate a peak-to-peak swing of the recording element or pen 17 of approximately four centimeters. As is well known, when the maximum peak-to-peak amplitude of the record of a signal voltage may be as great as four centimeters, the record readily may be calibrated and interpreted without optical magnification thereof. However, it will be understood that the upper limit of the range of frequency response of the oscillograph is limited principally by the ability of the pen to record with such amplitude, the upper limit of a workable range of frequencies for sinusoidal signal voltages being in the order of fifty to two hundred cycles per second. As will presently appear, electromagnetic means have been provided in the oscillograph of the present invention for driving the pen with such amplitude and at such frequencies. It will be understood that the pen loses its ability to record when, for any reason, it fails to leave a trace which is a faithful reproduction of the variations in the signal such, for example, as when the velocity of movement of the pen is such as to bend the pen or cause it to throw the ink therefrom, thereby to obscure the trace.

Electromagnetic type recording meters, and the like, heretofore available in the art for measuring signal voltages in the order of one cycle per second have not been found to be satisfactory for use at higher frequencies by reason of the frequency limitations imposed by the moving parts thereof and the power requirements imposed on the driver for the moving systems thereof. Likewise, oscillographs, heretofore known in the art and adapted to record with such amplitude and frequency such, for example, as those employing piezo-electric driving means, have not been found to give satisfactory results due to the inherent temperature and age limitations imposed by the crystals in the use of such oscillographs.

The drive mechanism 15 is supported, as by a suitable bracket 18, in fixed relation with respect to an electromagnetic transducer generally designated 19 for driving the pen 17, the pen preferably being arranged generally parallel to the plane of the moving chart and with its axis of rotation perpendicular thereto.

Ink for the pen is supplied through a length of flexible tubing 20 from a reservoir 21 which may be carried by the transducer in any convenient manner, here shown to be carried on the casing 22 of a motion multiplier mechanism 23, Fig. 3, which couples the pen to the driving arm 24 of the movable element 25 of the transducer. The motion multiplier mechanism may be of any type suitable for the purpose such as that used in the Brush Development Company, Piezo-Electric recorder motor, model P6, the mechanism being linear in action and adapted to provide the aforesaid peak-to-peak swing of the pen and having an amplification factor which is sufficiently great to require a relatively small deflection of the moving element of the transducer in order to suppress the effective mass thereof in relation to the effective mass of the pen whereby the upper limit of frequency response of the oscillograph may be extended to a limit imposed by the effective mass of the pen. The pen, for this purpose, is made as light as is consistent with a minimum strength thereof in order that the upper limit of frequency response may be extended to a desired value.

The effective mass of the pen is defined as its inertia or impedance to motion as viewed from the input end of the motion multiplier mechanism. Likewise, the effective mass of the moving element is defined as its inertia or impedance to movement. By reason of the high amplification factor of the motion multiplier mechanism, the effective mass of the pen is much greater than that of the element whereby the actual mass of the moving element may be greatly increased without substantially lowering the resonance frequency of the moving system including the pen, motion multiplier mechanism, and transducer element. The effective mass, or inertia, of the moving system, accordingly, is controlled substantially by the effective mass of the pen.

Transducer 19 comprises a core made up of a plurality of E-shaped laminations 26 which are clamped in stacked relation between a pair of frame members 27 by means of suitable screws 28.

The outer legs of the E-shaped core respectively carry a pair of identical coils 29, each of which comprises a large number of turns of fine wire. As will appear in greater detail hereinafter, coils 29 are employed to produce fluxes in the core adapted to actuate moving element 25 linearly as incremental currents are supplied to the coils from an electronic amplifier, one lead from each coil, for this purpose, being connected to a conductor 30 of a cable 31 extending to the amplifier and the other leads of the coils being connected to conductors 32 and 33 which comprise the other conductors of the cable.

Movable member 25 comprises an armature made up of a plurality of laminations of magnetic material 34 which are clamped in stacked relation to the driving arm 24 by means of suitable screws 35. The armature is employed for coaction with the E-shaped core, being mounted for rotary movement about a point near the end of the center leg of the core by means of a pair of T-shaped spring members 36. T-members 36 preferably are disposed on either side of movable element 25 and secured thereto and to the center leg of the core by means of suitable screws 37 which also serve to secure the laminations of the center leg, and of the armature in fixed stacked relation.

The thinned-out portion of each of spring members 36, effective in providing the spring action of each of the members, is thinned-out sufficiently to provide suitable compliance or stiffness as required by the desired upper limit of frequency response of the oscillograph. Thus, the spring stiffness of T members 36 may be made high enough in relation to the effective mass of the moving system, including pen 17, motion multiplier mechanism 23 and driving element 25, of the oscillograph so as to cause the motion of the moving system to be stiffness-controlled over a frequency range whose upper limit is imposed principally by the ability of the pen to record with amplitude sufficient to render the record capable of being calibrated and interpreted readily without optical magnification. As will appear in greater detail hereinafter, means are provided for causing the flat response of the moving system to be extended so as to include the region of mechanical resonance thus produced therein by reason of the compliance of spring members 36 in relation to the effective mass of the moving system. A sufficient cross-section of the thinned portion is retained, however, to provide sufficient compressional rigidity thereof in order to maintain the effective center of rotation of the armature in fixed lateral spaced relation to the center leg of the core.

The arrangement of spring members 36 with respect to the armature and core is such that the armature forms equal air gaps A1 and A2 with the ends of the outer legs of the core when no torque is applied to the armature. When equal currents are supplied to coils 29 as from a normally balanced source, the fluxes set up in the aforesaid air gaps are equal and no torque is applied to the armature. However, when the currents to the coils are unbalanced such that the current to one coil is increased by an increment and the current to the other coil is decreased by the same increment, the fluxes become unbalanced and a torque is applied to the armature proportional to the product of the normal balanced flux in either of the air gaps and the incremental change in flux thereof. The torque produced by the unbalanced flux in air gap A1 may be represented by the expression $$T1 = K(\Phi_0 + \Delta\Phi 1)^2$$

where

T1 is the torque tending to produce clockwise rotation of the armature as viewed in Fig. 1, K is the dimensional constant of the system, $\Phi_0$ is the balanced flux in air gap A1, and $\Delta\Phi 1$ is the increment of flux in air gap A1.

Similarly $$T2 = K(\Phi_0 - \Delta\Phi 2)^2$$

where

T2 is the torque tending to produce counterclockwise rotation of the armature as viewed in Fig. 1, and $\Delta\Phi 2$ is the increment of flux in air gap A2.

The increments of flux $\Delta\Phi 1$ and $\Delta\Phi 2$ are functions of the incremental currents supplied to the coils 29 individual thereto and of the instantaneous position of the armature as affecting the lengths of air gaps A1 and A2. However, by reason of the magnetic coupling inherent in the particular magnetic circuits employed, variations in the flux increments due to deflections of the armature from the balanced position thereof are negligible for small deflections. In practice, it has been found that the deflection of the armature may be as great as one half the normal or balanced length of either of air gaps A1 or A2 without introducing any appreciable non-linearity in the deflection of the armature with respect to the currents supplied. Accordingly, the increments of flux $\Delta\Phi 1$ and $\Delta\Phi 2$ are substantially equal for all values of incremental currents supplied within the operating limits of the oscillograph.

The resultant torque acting on the armature, therefore, is equal to the difference between torques T1 and T2 which may be represented by the expression $$Tr = T1 - T2 = 4K\Phi_0 \Delta\Phi$$

where

Tr is the resultant torque acting on the armature, and $\Delta\Phi = \Delta\Phi 1 = \Delta\Phi 2$ From the foregoing, it will now be evident that the resultant torque which causes movement of the armature is linear with respect to the increment of flux and hence to the increment in coil current. Driving arm 24 of moving element 25 is coupled to the motion multiplier mechanism 23 by means of a suitable link 38. Accordingly, pen 17 is caused to be deflected linearly as the armature of moving element 25 is caused to move linearly in response to incremental currents supplied to coils 29, the normal length of the air gaps being adjusted such that the desired maximum swing of pen 17 may be obtained with adequate linearity.

The other end of driving arm 24 carries a link 39 by means of which moving element 25 is coupled to a damping voltage generator generally designated 41 and mounted within a magnetic box-shaped shield 42 having a cover 43 through which link 39 is extended. Generator 41 comprises a U-shaped permanent magnet 44 and a soft iron pole piece 45 which are held in fixed spaced relation with respect to each other by being clamped between a pair of non-magnetic plates 46 and 47 by means of a suitable screw 48 which also serves to support the assembly of parts 44 through 48 within shield 42.

Generator 41 also comprises a coil 49 having many turns of fine wire and having one side thereof disposed within the air gap provided between magnet 44 and pole piece 45 therefor. Coil 49 is pivotally secured to clamping plate 46 by a pair of flexible spring members 51 such that the coil is permitted sufficient freedom of movement within the air gap so as to generate a voltage proportional to the velocity of movement thereof, this movement being imparted to the coil from moving element 25 by way of link 39 which is connected to the coil by means of a yoke 52 and flexible coupling members 53 in any convenient manner, preferably as shown.

Leads 54 of coil 49 conveniently may be secured to conductors 57 and 58 of a cable 56 which is anchored by means of a clamping plate 55 mounted on shield 42, cable 56 being extended to the aforesaid electronic amplifier for the purpose of applying the damping voltages generated by coil 49 thereto.

In order to provide flat frequency response from an electromechanical system, as is well known, the natural resonance of the vibrating members of the system must be suppressed by the application thereto of suitable mechanical damping or the equivalent thereof, the function of damping being to apply resisting forces to the vibrating members, which forces are instantaneously proportional to the velocities of the members.

This is accomplished in the electromechanical system, including pen 17 and transducer 19, of the present invention by utilizing the voltage generated by damping voltage generator 41 as a means for causing a resisting torque proportional to the instantaneous values of the damping voltage to be applied to the moving element 25 of the transducer, the torque being produced by incremental currents supplied to coils 29 of the transducer from the aforesaid electronic amplifier to which the damping voltage is applied, as pointed out hereinbefore.

It will be understood that the aforedescribed means for simulating mechanical damping may be applied to any electro-mechanical system in which provision may be made for generating a voltage externally of the system and proportional to the velocity of the moving element thereof and in which means may be provided for causing resisting forces to be applied to the moving element in proportion to the instantaneous values of the voltage generated. Moreover, it will be evident from the foregoing that the effect of these resisting forces on the moving element will be indistinguishable from the effect of mechanical damping thereon.

Shield 42 is formed of suitable material adapted to prevent magnetic coupling between driving coils 29 and coil 49 of damping voltage generator 41. Likewise, a shield 59 is provided for magnetically isolating coils 29 and 49 from external magnetic fields such, for example, as occur when several oscillographs are employed in a multi-channel recorder unit. Suitable end plates 61 and 62 secured to clamping members 27 serve to support shield 59, plate 62 also serving to support cable 31 and housing 22 of the motion multiplier mechanism.

Figure 8:
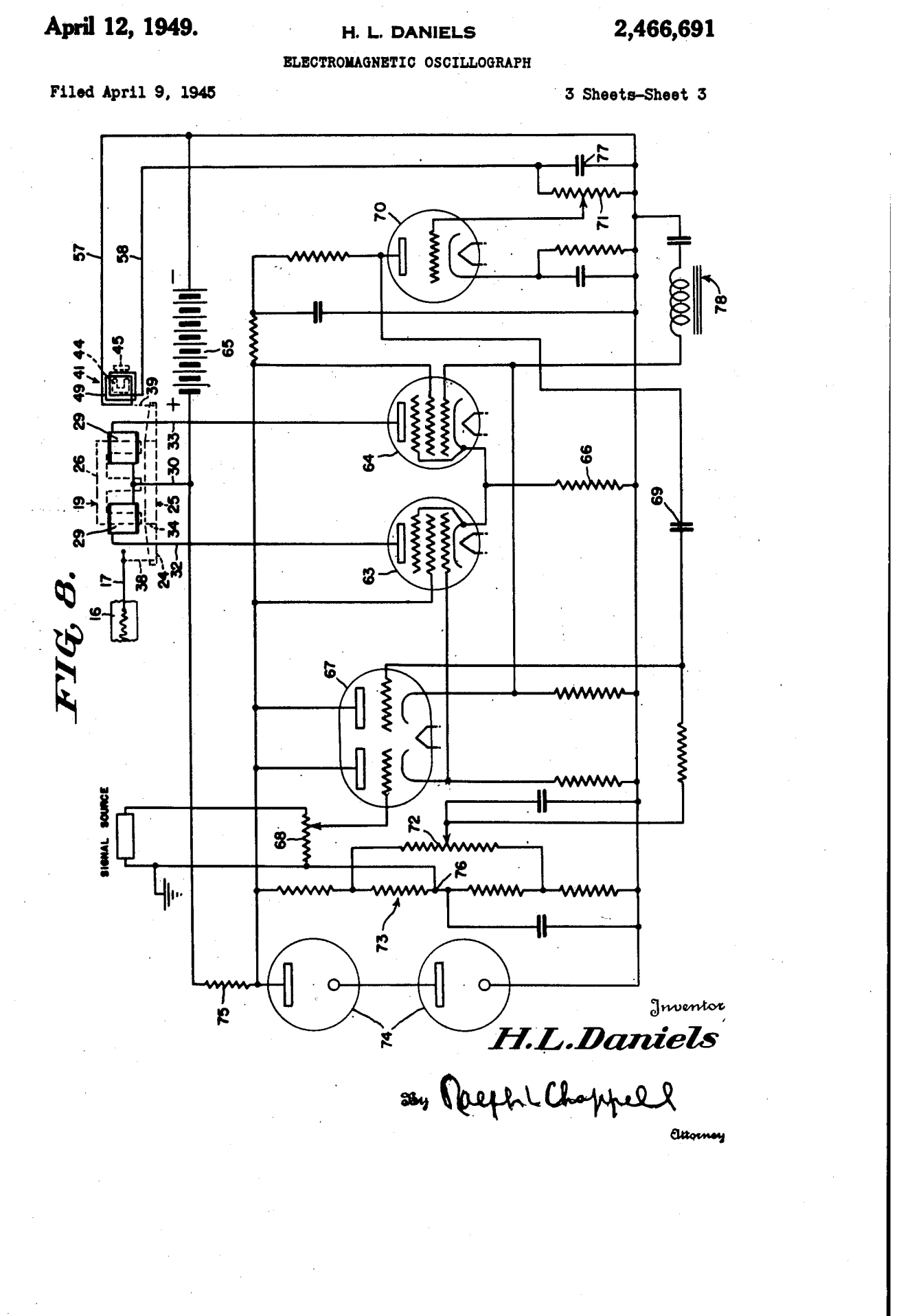

Referring now to Fig. 8 in which a diagrammatic view of the complete electrical system of the oscillograph is shown, it will be seen that the electronic amplifier heretofore referred to comprises a pair of conventional pentodes 63 and 64 which are connected in a normally balanced circuit in which coils 29 of transducer 19 constitute the plate loads for the tubes respectively, the power being supplied from a suitable D. C. source, here shown to be a battery 65. By reason of the common cathode impedance 66 for tubes 63 and 64, the application of a positive signal voltage to the control grid of either of the tubes causes an increase in the plate current of the tube to which the signal voltage is applied and a substantially equal decrease in the plate current of the other tube, which increase and decrease in current may be regarded as equal current increments of opposite polarity with the balance current taken as a base or reference. Tubes, such, for example, as pentodes 63 and 64 which have internal resistances which are high compared to the varying load impedances provided by coils 29 individual thereto, must be employed in order that the current increments provided thereby be proportional to the signal voltage applied thereto and substantially independent of the frequency of the signal voltage. It will be understood that any means adapted to supply incremental currents of such character may be employed for use with transducer 19. However, as will more fully appear hereinafter, tubes 63 and 64 are well adapted for use with the oscillograph of the present invention for the reason that either of the tubes may receive the signal voltage to be recorded or both of the tubes may receive separate signal voltages concurrently, one of the tubes receiving the driving signal voltage and the other tube receiving a damping signal voltage.

A suitable means, here shown to be a conventional dual triode 67, is employed to provide a high input impedance for the control grids of pentodes 63 and 64, each of the two sections of the triode being connected as a cathode follower in accordance with a conventional circuit arrangement. The use of triode 67 permits operation of the pentodes from a high impedance source of a signal voltage to be recorded by the oscillograph, such a source, for example, being a crystal hydrophone adapted to provide a voltage which simulates the envelopes of energy resident in the sound produced by ships or torpedoes. The signal voltage from the signal source shown is applied to the grid of one section of triode 67 from a suitable input attenuator 68. In the event that the signal voltage to be recorded is derived from a low impedance source, the signal may be applied directly to the control grid of pentode 63, if desired.

The other section of triode 67 drives the control grid of pentode 64 in accordance with the instantaneous values of the damping signal voltage which is applied to the control grid of the damping section of triode 67 by way of condenser 69 after being amplified by a suitable amplifier tube 70. The damping signal voltage from coil 49 of damping generator 41 is applied by way of potentiometer 71 to the control grid of tube 70, potentiometer 71 being adjusted to provide the desired amount of damping to be applied to transducer 19.

Potentiometer 72 permits an adjustment of the control grid potential of the damping signal section of triode 67 whereby the initial or normal plate currents of the pentodes may be set in any desired ratio including that providing a condition of balance in the absence of an applied signal. Potentiometer 72 derives its potential from a voltage divider network 73 connected across series connected voltage regulator tubes 74, also supplied from source 65 by way of the usual series impedance 75. Point 76 in divider network 73 fixes a suitable point in the electrical system at ground potential.

Satisfactory results have been obtained in a specific circuit arrangement wherein a pair of VR–105 tubes, a 6SL7, a pair of 6AC7 tubes, and a 6SF5 were used for tubes 74, 67, 63 and 64, and 70 respectively. A potential of 350 volts was provided for battery 65, 5000 ohms was used for resistance 75, 50,000 ohms was used for each of the cathode load resistors of tube 67, 2500 ohms was used for resistor 66, and 310,000 ohms was used above, and 110,000 ohms used below, center tap 76 in voltage divider network 73.

It will be apparent, that although the incremental currents supplied to coils 29 are, in fact, controlled by the resultant of the signal voltage and the amplified damping voltage, it is entirely correct to consider that these currents are the resultant of components which would be produced by each of these voltages if acting separately and that the forces produced by these currents may be similarly resolved. It will be further apparent, therefore, that the effect of mechanical damping on transducer 19 may be produced, and the amount thereof conveniently controlled independently of the driving signal voltage, by employment of the aforedescribed electrical damping means. It follows, therefore, that the amount of damping may be set at will to provide optimum flatness of the frequency response of the oscillograph.

The use of mechanical damping on a moving system, in practice, usually introduces instability in the operation thereof in accordance with the amount of damping applied by reason of changes in the energy absorbing properties of the damping materials employed with such variables as temperature, humidity and age, which changes may also render the system non-linear in operation. It will be appreciated that the electrical damping system of the present invention avoids these difficulties for the reason that use of such materials is not required.

It has been found that undesired electrical or mechanical phase shift in the electromechanical system may cause self-sustaining oscillations thereof at frequencies which are high compared to those within the operating range of the oscillograph. This may be avoided by use of suitable electrical means such, for example, as condenser 77 and the resonant circuit generally designated 78 which cause the amplifier to produce such frequency discrimination as to suppress the self-sustaining oscillations without otherwise affecting operation of the amplifier over the desired range of frequency response of the oscillograph.

Equivalent frequency discrimination may be provided in the mechanical system of transducer 19 by the addition to the movable element 25 thereof of a suitable vibration absorbing element which is effective only at frequencies which are high compared to the frequencies within the operating range of the oscillograph. In Fig. 9, such an element 79 is shown secured to driving arm 24 of transducer 19 by means of a screw 81 and mounted with respect to the arm so as to interpose mechanical resistance between the arm and a suitable weight 82 suspended by the element. The element, for this purpose, preferably is formed of a viscous material such as that known in the art as a Vinylite resin. For the reason that the effective mass of moving element 25 is suppressed relative to the effective mass of pen 17, additional elements 79 and 82 advantageously may be mounted thereon without appreciably effecting the operation of transducer 19.

From the foregoing description of the several parts of the oscillograph the operation thereof should now be apparent. It will suffice therefore merely to describe the operation in a general manner.

The signal voltage to be recorded by the oscillograph is derived from a signal source such as that diagrammatically shown in Fig. 8 and is applied to pentode 63 by way of the high impedance input therefor afforded by dual triode 67 which, for this purpose, is connected in a cathode follower circuit. The signal voltage thus applied to pentode 63 causes pentodes 63 and 64 to supply incremental currents proportional to the instantaneous values of the signal voltage to coils 29 of transducer 19, and the coils in turn produce equal and opposite flux increments in air gaps A1, A2 whereupon a resultant torque which is linear with respect to the currents supplied is exerted upon the normally balanced movable element 25 of the transducer. The torque thus exerted on the element causes the element to be deflected linearly with respect to the currents supplied, and the motion thus produced is imparted to pen 17 by way of the motion multiplier mechanism 23, thus the pen is driven linearly with respect to the instantaneous values of the signal voltage and thereby is caused to leave a record which is a true reproduction thereof.

In the event that the signal voltage comprises frequency components resident within the region of mechanical resonance of the moving system of the oscillograph, a damping voltage signal from damping generator 41 is applied to pentode 64 by way of amplifier tube 70 and dual triode 67. The damping voltage thus applied to pentode 64 causes pentodes 63 and 64 to supply incremental currents proportional to the instantaneous values of the damping signal voltage to coils 29 of the transducer in the same manner as in the case of the signal voltage, the damping signal voltage, however, being effective in producing a torque on moving element 25 adapted to suppress resonant peaks in the response of the oscillograph whereby flat response extending into the region of mechanical resonance thereof is obtained therefrom. When the signal voltage comprises frequency components outside the region of mechanical resonance, damping voltages are generated by generator 41 and produce torques on element 25 which diminish the amplitude of swing of the pen in accordance with the amount of damping provided by the setting of potentiometer 71, the action being similar to feedback wherein the output is reduced in proportion to the amount of feedback in the system.

From the foregoing it should now be apparent that an oscillograph has been provided which is well adapted to fulfill the aforestated objects of the invention. Moreover, while the invention has been described in particularity with respect to a particular embodiment thereof which gives satisfactory results, it will be apparent to those skilled in the art that additional embodiments and modifications thereof may be devised without departing from the spirit and scope of the invention as defined by the appended claims.

The invention herein defined and claimed may be manufactured and used by or for the Government of the United States of America for governmental purposes without payment of any royalties thereon or therefor.

What is claimed as new and desired to be secured by Letters Patent of the United States is:

1. In a high speed direct-recording oscillograph, the combination of a pen of low mass, an electromagnetic transducer comprising an E-shaped magnetic core, a pair of coils on said core, a movable magnetic element, a moving system comprising said pen and element and adapted to cause deflections of the pen which are linear with respect to driving currents supplied to said coils, means including an electronic amplifier for supplying said currents linearly in accordance with the instantaneous values of a variable signal to be recorded by the oscillograph, and a spring secured to said core and constructed and arranged to support said element movably in operative proximate spaced relation with respect to the core, said spring having sufficient stiffness in relation to the mass of the moving system as to cause the motion thereof to be stiffness-controlled over a predetermined frequency range.

2. In a high speed direct-recording oscillograph, the combination of a pen of low mass, an electromagnetic transducer comprising a magnetic core, a coil on said core, a movable magnetic element, a moving system comprising said pen and element and adapted to cause deflections of the pen in response to movement of said element, which deflections are linear with respect to driving currents supplied to the coil, means for supplying said currents linearly in accordance with the instantaneous values of a variable signal to be recorded by the oscillograph, and resilient means secured to said core and to said element for supporting this element movable in operative proximate spaced relation with respect to the core.

3. In a high speed direct-recording oscillograph, the combination of a pen, an electromagnetic transducer having a pair of fixed coils and a movable element, a moving system comprising said pen and element for driving the pen linearly in response to equal current increments of opposite polarity respectively supplied to said coils, means for causing motion of the moving system to be stiffness-controlled over a predetermined range of frequencies including the region of mechanical resonance of the moving system, means for generating a damping signal voltage proportional to the velocity of motion of the moving system, and an electronic amplifier adapted to receive said damping signal voltage and a driving signal voltage to be recorded by the oscillograph and to supply said current increments to said coils linearly in accordance with the instantaneous values of said driving and damping signal voltages.

4. In a high speed direct-recording oscillograph, the combination of a pen, a pair of fixed coils, a movable element of magnetic material adapted to be actuated linearly in response to incremental fluxes set up by said coils as equal current increments of opposite polarity respectively are received thereby, a moving system comprising said pen and element for driving the pen linearly in response to movement of the element, means including at least one supporting member for said element for causing motion of the moving system to be stiffness-controlled over a predetermined range of frequencies including the region of mechanical resonance of the moving system, means including a coil adapted to be driven by the moving system for generating a damping signal voltage proportional to the velocity of motion of the moving system, and an electronic amplifier including a pair of vacuum tubes, said tubes being arranged to receive said damping signal voltage and a driving signal voltage concurrently therewith and to supply said current increments to said coils linearly in accordance with the instantaneous values of said driving and damping signal voltages.

5. In an electromechanical transducer of the character disclosed, the combination of a plurality of fixed coils, a movable element of magnetic material, and signal receiving means for supplying balanced currents to said coils when no signal is received thereby and for supplying respectively equal and opposite polarity increments of the balanced currents to the coils in accordance with the instantaneous values of signals received thereby, said coils being arranged to set up balanced fluxes in said element adapted to exert balanced forces thereon such that the resultant torque acting on the element is zero when said balanced currents are received by said coils, said current increments being adapted to unbalance said forces such that a resultant torque proportional to the product of the balanced current in any one of said coils and the incremental change therein is exerted on the element when a signal is received.

6. In a push-pull electromagnetic driver of the character disclosed, the combination of a fixed magnetic core member having three legs, a movable magnetic core member arranged in spaced relation with respect to said fixed core member so as to provide an air gap between each of the legs thereof and the movable member, at least one spring member for supporting said movable core members for relative rotative movement therebetween and in said spaced relation so as to maintain a substantially constant air gap between the movable member and one of the legs of the fixed core member, means for setting up magnetic fluxes in the air gaps between the movable member and the other legs of said fixed core member adapted to cause rotative movement of the movable member in response to an unbalance in said fluxes and in an amount controlled by the stiffness in said spring member, said spring member having sufficient compliance to control the mechanical resonance of the movable member, and electrical means for unbalancing said fluxes to cause damping movement of the movable core member as movement is imparted thereto whereby the range of flat frequency response of the movable core member includes said region of mechanical resonance.

7. In a push-pull electromagnetic driver of the character disclosed, the combination of a fixed magnetic core member having three legs a movable magnetic core member arranged in spaced relation with respect to said fixed core member so as to provide an air gap between each of the legs thereof and the movable member, at least one spring member for supporting said fixed and movable core members for relative rotative movement therebetween and in said spaced relation so as to maintain a substantially constant air gap between the movable member and one of the legs of the fixed core member, and means including a pair of coils disposed about each of the other legs of said fixed core member for producing normally balanced fluxes in the air gaps between the movable core member and said other legs in response to balanced currents received by said coils and for producing equal and opposite polarity incremental variations in said fluxes in response to equal and opposite polarity incremental changes in said currents thereby to exert a torque on the movable member which is linear with respect to the current increments received.

8. In an oscillograph of the character disclosed, the combination of a recording element, an electromagnetic transducer for driving said element linearly in accordance with driving currents supplied thereto and having means for generating a voltage proportional to the velocity of motion thereof, and an electronic amplifier adapted to receive said velocity voltage and a driving signal voltage and to supply said driving currents in accordance with the resultant of said velocity and driving voltages.

9. In a vibrating system of the character disclosed, the combination of an electromechanical transducer having a moving element and means for generating a voltage instantaneously proportional to the velocity of motion of the element, means including said transducer adapted to receive said voltage and to exert resisting forces on said element which simulate mechanical damping thereon, and high frequency vibration absorbing means coupled to said element and adapted to prevent self-oscillation of the system at frequencies which are high with respect to the normal operating range of frequencies of the system.

10. In a vibrating system of the character disclosed, the combination of an electromechanical transducer having a moving element and means for generating a voltage instantaneously proportional to the velocity of motion of the element, electrical means including said transducer and an electronic driver therefor responsive to said voltage and adapted to exert resisting forces on said element which simulate mechanical damping thereon, and electrical circuit means for causing said electronic driver to discriminate against said voltage when it is produced by self-oscillation of the system at frequencies above the normal operating range of frequencies of the system.

11. In a vibrating system of the character disclosed, the combination of a vibrating element, damping means including an electronic driver for said element and adapted to apply electromagnetic resisting forces on the element which simulate mechanical damping thereon, and means for preventing self-oscillation of the system at frequencies above the normal operating range of frequencies of the system.

12. In a high speed direct-recording oscillograph, the combination of a pen, a pair of fixed coils, a movable element of magnetic material adapted to be actuated linearly in response to incremental fluxes set up by said coils as equal current increments of opposite polarity respectively are received thereby, a moving system comprising said pen and element for driving the pen linearly in response to movement of the element, means including at least one supporting member for said element for causing motion of the moving system to be stiffness-controlled over a predetermined range of frequencies including the region of mechanical resonance of the moving system, means including a coil adapted to be driven by the moving system for generating a damping signal voltage proportional to the velocity of motion of the moving system, and an electronic amplifier including a pair of vacuum tubes, said tubes being arranged to receive said damping signal voltage and a driving signal voltage concurrently therewith and to generate said current increments in accordance with the instantaneous values of said damping and driving voltages, said tubes being connected to said coils respectively and having high output impedances with respect to the input impedances of the coils.

HOWARD L. DANIELS.

REFERENCES CITED

The following references are of record in the file of this patent:

UNITED STATES PATENTS

| Number | Name | Date |
|---|---|---|
| 130,971 | Batchelder | Sept. 3, 1872 |
| 896,292 | MacGahan | Aug. 18, 1908 |
| 1,010,160 | MacGahan | Nov. 28, 1911 |
| 1,031,041 | Conrad et al. | July 2, 1912 |
| 1,031,042 | Conrad et al. | July 2, 1912 |
| 1,535,538 | Maxfield | Apr. 28, 1925 |
| 1,645,282 | Hanna | Oct. 11, 1927 |
| 1,792,859 | Mitchell | Feb. 17, 1931 |
| 1,901,443 | Garvin | Mar. 14, 1933 |
| 1,940,586 | Fereday | Dec. 19, 1933 |
| 1,942,587 | Whitman | Jan. 9, 1934 |
| 2,330,427 | Hornfeck | Sept. 28, 1943 |
| 2,367,746 | Williams | Jan. 23, 1945 |
| 2,372,594 | Martin | Mar. 27, 1945 |

FOREIGN PATENTS

| Number | Country | Date |
|---|---|---|
| 272,622 | Great Britain | June 20, 1927 |